United States Patent
Ainsworth et al.

(10) Patent No.: US 6,852,165 B2
(45) Date of Patent: Feb. 8, 2005

(54) POWDER SPRAY COATING

(75) Inventors: James Ainsworth, Runcorn (GB); Christopher Eastwood, Stockport (GB); Robert Perrin, Stockport (GB)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/122,530

(22) Filed: Apr. 15, 2002

(65) Prior Publication Data

US 2002/0157604 A1 Oct. 31, 2002

Related U.S. Application Data (63) Continuation of application No. 09/486,939, filed as application No. PCT/GB98/02659 on Sep. 4, 1998, now Pat. No. 6,461,431.

(30) Foreign Application Priority Data

Sep. 5, 1997 (GB) .............................................. 9718944

(51) Int. Cl.$^7$ ................................................ B05B 1/28
(52) U.S. Cl. .......................... 118/326; 118/309; 454/50
(58) Field of Search ................................ 118/326, 309, 118/303, 634, DIG. 7; 454/50, 51, 53

(56) References Cited

U.S. PATENT DOCUMENTS

| | | | |
|---|---|---|---|
| 3,714,926 A | 2/1973 | Ofner | |
| 3,719,030 A | * 3/1973 | Blankemeyer et al. | ...... 118/326 |
| 3,814,002 A | 6/1974 | Rombach et al. | |

(List continued on next page.)

FOREIGN PATENT DOCUMENTS

| | | |
|---|---|---|
| CH | 529 590 B | 10/1972 |
| DE | 30 25 588 A1 | 2/1982 |
| DE | 34 08 014 A1 | 9/1985 |
| DE | 37 15 470 A1 | 11/1988 |
| DE | 89 07 538.2 | 10/1990 |
| DE | 295 18 478 U1 | 1/1996 |
| DE | 195 17 729 A1 | 2/1996 |
| DE | 195 00 873 A1 | 7/1996 |
| DE | 196 44 360 C2 | 4/1998 |
| EP | 0 223 660 A1 | 5/1987 |
| EP | 0 165 815 B1 | 5/1989 |
| EP | 0 678 336 A2 | 3/1995 |
| EP | 0 689 875 A2 | 6/1995 |
| EP | 0 698 421 A1 | 2/1996 |
| EP | 0 701 868 A1 | 3/1996 |
| EP | 0 839 582 B1 | 5/1998 |
| EP | 0 839 583 B1 | 5/1998 |
| FR | 2 675 061 | 10/1992 |
| FR | 2 724 583 | 3/1996 |
| GB | 429028 | 5/1935 |
| GB | 2 120 303 A | 11/1983 |
| GB | 2 141 642 A | 1/1985 |
| WO | WO 95/10365 | 4/1995 |
| WO | WO 99/12658 A1 | 3/1999 |

OTHER PUBLICATIONS

English translation Abstract of EP 0,698,421.*

*Primary Examiner*—Chris Fiorilla
*Assistant Examiner*—Yewebdar Tadesse
(74) *Attorney, Agent, or Firm*—Calfee, Halter & Griswold LLP (57) ABSTRACT

A powder spray apparatus is described including a powder booth with a scraper bar which reciprocates across the floor thereof to collect deposited overspray powder and supply it to intakes located at each end wall. The intakes are connected by a feed channel to one or more cyclone separators. An exhaust duct may also be provided for air-borne overspray powder which preferably forms part of the feed channel. Powder recovered from the cyclone separators may be passed to a common collection hopper by use of a venturi pump which transfers the powder from each separator to the hopper via a sieve located in a ventilated enclosure above the hopper.

29 Claims, 4 Drawing Sheets

U.S. PATENT DOCUMENTS

| | | | |
|---|---|---|---|
| 3,905,785 A | 9/1975 | Fabre | |
| 3,918,641 A | 11/1975 | Lehmann et al. | |
| 4,153,008 A | 5/1979 | Marino et al. | |
| 4,378,728 A | 4/1983 | Berkmann | |
| 4,409,009 A | 10/1983 | Lissy | |
| 4,430,956 A | 2/1984 | Koch, II | |
| 4,504,292 A | 3/1985 | Vohringer | |
| 4,537,120 A * | 8/1985 | Josefsson | 98/115.2 |
| 4,704,953 A | 11/1987 | Wilson | |
| 4,715,314 A | 12/1987 | Ramseier et al. | |
| 4,770,089 A | 9/1988 | Vinicombe | |
| 4,926,746 A | 5/1990 | Smith | |
| 5,042,420 A | 8/1991 | Gerdes | |
| 5,107,756 A * | 4/1992 | Diaz | 118/326 |
| 5,153,028 A * | 10/1992 | Shutic et al. | 118/326 |
| 5,256,201 A | 10/1993 | Gelain et al. | |
| 5,275,634 A | 1/1994 | Kramer | |
| 5,346,553 A | 9/1994 | Pingel | |
| 5,421,885 A | 6/1995 | Trevisan | |
| 5,615,980 A | 4/1997 | Mauchle | |
| 5,681,390 A | 10/1997 | Lacchia | |
| 5,766,355 A | 6/1998 | Josefsson et al. | |
| 5,928,423 A | 7/1999 | Toyota et al. | |
| 6,010,571 A | 1/2000 | Josefsson et al. | |
| 6,461,431 B1 * | 10/2002 | Ainsworth et al. | 118/326 |

* cited by examiner

POWDER SPRAY COATING

RELATED APPLICATIONS

This application is a continuation of U.S. patent application Ser. No. 09/486,939 filed on Jun. 19, 2000 for IMPROVEMENTS RELATING TO POWDER SPRAY COATING, now issued as U.S. Pat. No. 6,461,431, which is a national application under 35 U.S.C. 371 of PCT/GB98/02659 filed on Sep. 4, 1998 for IMPROVEMENTS RELATING TO POWDER SPRAY COATING and which claims the benefit of Great Britain patent application no. 9718944.3 filed on Sep. 5, 1997 for IMPROVEMENTS RELATING TO POWDER SPRAY COATING, the entire disclosures of which are fully incorporated herein by reference.

This invention relates to powder spray coating and, in particular, to the recovery of powder which has not adhered to the article to be coated from a powder spray booth.

The powder which does not adhere to an object to be coated in a powder spray booth is known as the "overspray". Overspray powder may miss the object to be coated, rebound from a surface of the object, or be deflected by the electrostatic fields in the spray booth away from the object.

It is known to recover overspray powder by exhausting the air from the booth and hence the air-borne overspray. Filter elements have been used to recover overspray from powder spray booths and are capable of removing substantially all the overspray from the spray booth exhaust air so that the powder may be reused. Such filter elements require frequent cleaning in order to prevent them from becoming blocked or clogged with powder and this is usually carried out by reverse pulses of pressurised air which dislodge powder adhering to the filter elements.

It is also known to use cyclone separators instead of, or in conjunction with, filter elements for collection of overspray. Cyclone separators are effective in removing the majority of the overspray from the spray booth exhaust air and are easier to clean than filters because very little powder is deposited inside the cyclone housing.

In known arrangements, the cyclone separators used in powder recovery have either been very large single or dual side by side cyclones or multi cyclones having tangential or axial feed inlets. In cyclones of the vertical feed type, the air entrained overspray powder is fed vertically downwards from a common inlet manifold into the separators and a circumferential velocity is imparted thereto by a number of radial veins. In such vertical cyclones, the overspray powder is separated from the air by the combined effect of centrifugal and gravitational forces and falls to the bottom of the separators there to be collected and removed. The cleaned air is then directed vertically upwards through ducts, one per cyclone separator, which pass through the centre of the veins and into an exhaust manifold. The cleaned air then passes through a further powder recovery unit containing a number of filter elements to remove any fine powder particles entrained in the air.

Such vertical feed cyclone separators, when arranged in a module of a cluster of small cyclones, render the module difficult to clean thoroughly as power tends to impinge and adhere to the inlet areas of the cyclone and the veins directly below the inlet areas and to the vertical exhaust ducts passing through the centre of the veins. These surfaces are difficult to clean properly, particularly where there is a large number of cyclone separators because these areas are generally not easily accessible. The cleaning of such a powder recovery module, when changing the colour of powder to be recovered thereby, for example, is a lengthy process.

An arrangement intended to reduce the amount of overspray retained in the cyclone separators of a recovery module and facilitate cleaning of the retained overspray is disclosed in European Patent Application Number 94929600.8. A powder recovery module is provided comprising at least two tangential feed cyclone separators, each with a horizontal tapered feed channel having a dedicated inlet, the inlet lying in a common plane disposed near the ceiling of the powder spray booth when the module is mounted to one of the side walls of the powder spray booth. An overspray intake is located near the floor of the powder spray booth and a channel connects the intake to the inlet. The arrangement has the advantage that a greater proportion of overspray is separated from the spray booth exhaust air through use of the tangential feed cyclone separators in combination with the tapering feed channels. The geometrical arrangement of the inlets to the cyclone separator feed channels and the configuration of the tangential feed cyclone separators facilitates the cleaning of the surfaces to which overspray may adhere by means of an air hose, for example.

The above described arrangement has been found to work well in practice. However, changing the powder colour may still be a time-consuming task because of the time required to clean the booth. The booth needs sweeping to remove powder which was deposited on the walls and ceiling and on the floor and cannot be extracted by air exhaustion. In addition the cyclone separators and the channels leading thereto need to be cleaned which can be a time-consuming and difficult operation because of the limited access to the interiors thereof.

Proper cleaning of the walls and floor of a powder spray booth between colour changes is very important to ensure acceptable production quality. Such cleaning may be carried out manually by an operator using a scraping and/or compressed air jet apparatus. Booths have been proposed which are intended to automate the deposited overspray powder cleaning process. U.S. Pat. No. 4,153,008 discloses a booth with a floor in the form of a conveyor belt which continuously transports powder to the exterior of the booth where the powder is removed from the belt by a suction nozzle and then passed to a separator. U.S. Pat. No. 4,430,956 discloses a booth with a rotating arm on the floor which sweeps up deposited powder and passes it to a hopper positioned below the floor. European Patent Application No. 0701868 also discloses an arrangement with a floor scraper but in this case scrapers are also provided for the walls and ceiling, the collected powder again being transferred to a collection hopper located below the booth.

Even with the relatively sophisticated and therefore costly arrangements proposed for cleaning of deposited powder, the cleaning times for each change of powder colour are still considerable with consequently long periods during which the booth is out of operation. Furthermore, effective cleaning is still not guaranteed because of the difficulties involved in total removal of the powder which may be very fine.

One solution involves the use of a number of booths each dedicated to spraying of a particular powder colour. In an alternative solution, two or more booths are provided which can be moved alternately in and out of the production line to allow cleaning of one whilst the other is operational and vice versa.

British Patent Application No. 2141642 proposes that the deposited powder cleaning problems discussed above should be overcome by use of a booth in which the roof and/or walls are provided with replaceable coverings. The booth includes a collapsible suction tube for removal of air-borne overspray and also has a floor in the form of a rotatable disc by means of which deposited overspray passes outside the booth to a suction collector which is also connected to the collapsible suction tube. The proposed arrangement like the others discussed above suffers from the disadvantage that it is complicated and therefore costly and prone to failure.

German Utility Model G8907538.2 describes a powder spray booth with a primary extraction system comprising a filter around the spraying area and a secondary extraction system comprising extraction channels near the booth floor through which deposited overspray is sucked. The two extraction systems have separate suction devices.

It is an object of the present invention to provide a colour spray apparatus in which powder colour can be changed quickly and easily and which, moreover, is of relatively simple construction.

It is another object of the present invention to provide a colour spray apparatus in which both air-borne and deposited overspray can be recovered by a system involving a small number of relatively simple parts which are themselves readily cleaned.

It is a further object of the present invention to provide a powder recovery system for recovering both air-borne and deposited overspray employing suction means in which the amount of suction applied to the air-borne overspray and the deposited overspray can be varied.

It is a still further object of the present invention to provide a powder recovery module including at least one cyclone separator in which sieving to remove foreign objects or powder agglomerations can be carried out simply and efficiently and without impairing the operation of the cyclone separator.

A powder spray apparatus, in accordance with one aspect of the invention, comprises a powder spray booth having a floor, side walls and end walls, one or more powder spray devices positioned with respect to the side walls to spray articles passed through the booth via access openings in the end walls, a powder recovery module comprising at least one cyclone separator having an intake disposed close to, or towards, the ceiling of the powder spray booth, an overspray intake at each end of the booth, each overspray intake being positioned close or adjacent, to the floor of the powder spray booth and the end wall and a feed channel connecting each intake with the cyclone separator, and a scraper bar for continuously reciprocating across the booth floor between the end walls to collect powder on the booth floor and move the collected powder towards the end walls of the spray booth adjacent to which the overspray intakes are provided.

The floor of the booth is swept clean by the scraper bar which reciprocates backwards and forwards to gather up overspray and deliver it at the end of each stroke to one of the intakes. The collected powder is drawn into an air stream and, via a low level exhaust vent, to the cyclone separator. The location of the cyclone separator intakes, adjacent the end walls, in combination with use of a scraper bar has been found to result in an efficient removal of overspray powder from the booth.

In a preferred embodiment, each feed channel includes a vertical section between the respective intakes and the inlet of the cyclone separator, the vertical section being formed in two parts, one of which is removable such as to provide access to the interior of the vertical section. The arrangement facilitates cleaning of the powder recovery module by providing for access to the powder passage from the booth to the cyclone separator or separators.

A powder spray apparatus in accordance with another aspect of the invention comprises a powder spray booth having a floor, side walls and end walls, one or more powder spray devices positioned with respect to the side walls to spray articles passed through the booth via openings in the end walls and a powder recovery module comprising separation means for separating powder from a powder-air mixture, suction means for removing overspray powder from the booth, an exhaust duct connected to the suction means and communicating with the booth a passage of air-borne overspray powder, collection means for collecting deposited overspray powder from the booth floor and a feed channel connected to the suction means, wherein the collection means moves the collected deposited overspray powder to the feed channel through which it is passed under the action of the suction means to the separation means characterised in that the exhaust duct forms part of the feed channel and in that the apparatus includes means for adjusting the relative amount of suction provided by the suction means to, respectively, the air-borne overspray and the deposited overspray.

The dual removal both of air-borne overspray and deposited overspray increases overall usage efficiency. However, by making at least one part of the removal systems common to both, the recovery module is simplified as to its construction and cleaning.

During a spraying operation greater suction can be provided to the air-borne overspray, as the amount thereof will likely be greater than the amount of deposited overspray. At or near the end of a spraying operation, the amounts of suction can be varied so that the suction on the deposited overspray is increased corresponding to the decrease and eventual cessation of air-borne overspray so that the maximum suction can be applied to the deposited overspray to thereby facilitate and accelerate cleaning of the booth.

The exhaust duct may comprise a pipe with an aperture providing for communication between the booth interior and the pipe interior. The aperture may be defined by a cover positioned across an opening in the pipe but spaced from the pipe. The relative amount of suction can be varied in a simple fashion by adjusting the position of the cover relative to the pipe opening thereby to vary the size of the aperture.

Very preferably, the powder recovery module comprises two cyclone separators, one adjacent each end wall of the powder spray booth.

The powder recovery module may comprise a filter module for removal of fine powder particles entrained in the exhaust air. Suitably, for reasons of economy and space, the two cyclone separators are connected to a common filter module.

The scraper bar may be magnetically coupled to a drive positioned externally of the powder booth. The advantage of this is that the drive mechanism is protected from the powder and the amount of equipment which needs to be cleaned on changing powder colour is reduced.

To maximise the amount of powder which settles on the floor of the booth and can, therefore, be collected by the scraper bar, the booth walls and ceiling are preferably formed from non-conductive material. For example, the booth ceiling may be made from a plastic material as may be the cyclones and channels which connect these to the booth. Alternative materials include stainless steel.

A further advantage of constructing the booth from non-conductive material is that the amount of overspray powder which is passed to the cyclone is relatively constant during a spraying operation. If, instead, powder is allowed to build up on the booth space and walls, then, on cleaning down, large quantities of powder may be delivered to the cyclones which will result in cyclone efficiency drop off.

The invention in a further aspect provides a method of operating a powder spray apparatus having a powder spray booth including at least one powder spray device for spraying articles passed through the booth, the method comprising exhausting air from the booth by suction at a first extraction location to withdraw air borne overspray powder via the first extraction location, collecting deposited overspray powder from the interior of the booth, transferring the collected deposited overspray powder to a second extraction location, withdrawing the collected deposited overspray powder in an air current by suction at the second extraction location, and separating the overspray powder from the air wherein the method includes varying the relative amounts of suction applied at the first and second extraction locations.

As discussed above, the advantage of this is that the overspray powder extraction can be accomplished in a particularly efficient manner, facilitating and accelerating booth cleaning therefore changing of the colour of powder being sprayed.

Suitably the or each cyclone separator is provided with a transfer means for transferring powder from the cyclone separator to a powder collection hopper through a sieve located between the cyclone separator and the powder collection hopper. The location of the sieve is outside the cyclone with the separated powder being removed from the cyclone before being deposited onto the sieve means that the cyclone design and performance is not limited by the need to accommodate a sieve within its body.

The transfer means may comprise a venturi pump. A mini cyclone separator may be located between the transfer means and the sieve to remove the transfer air and enhance sieve efficiency.

The collection hopper and sieve, as well as the mini cyclone if provided, may be located in a ventilated enclosure. This allows the sieve to be cleaned without contaminating the workshop.

The invention will now be further described by way of example with reference to the accompanying drawings in which.

Figure 1:
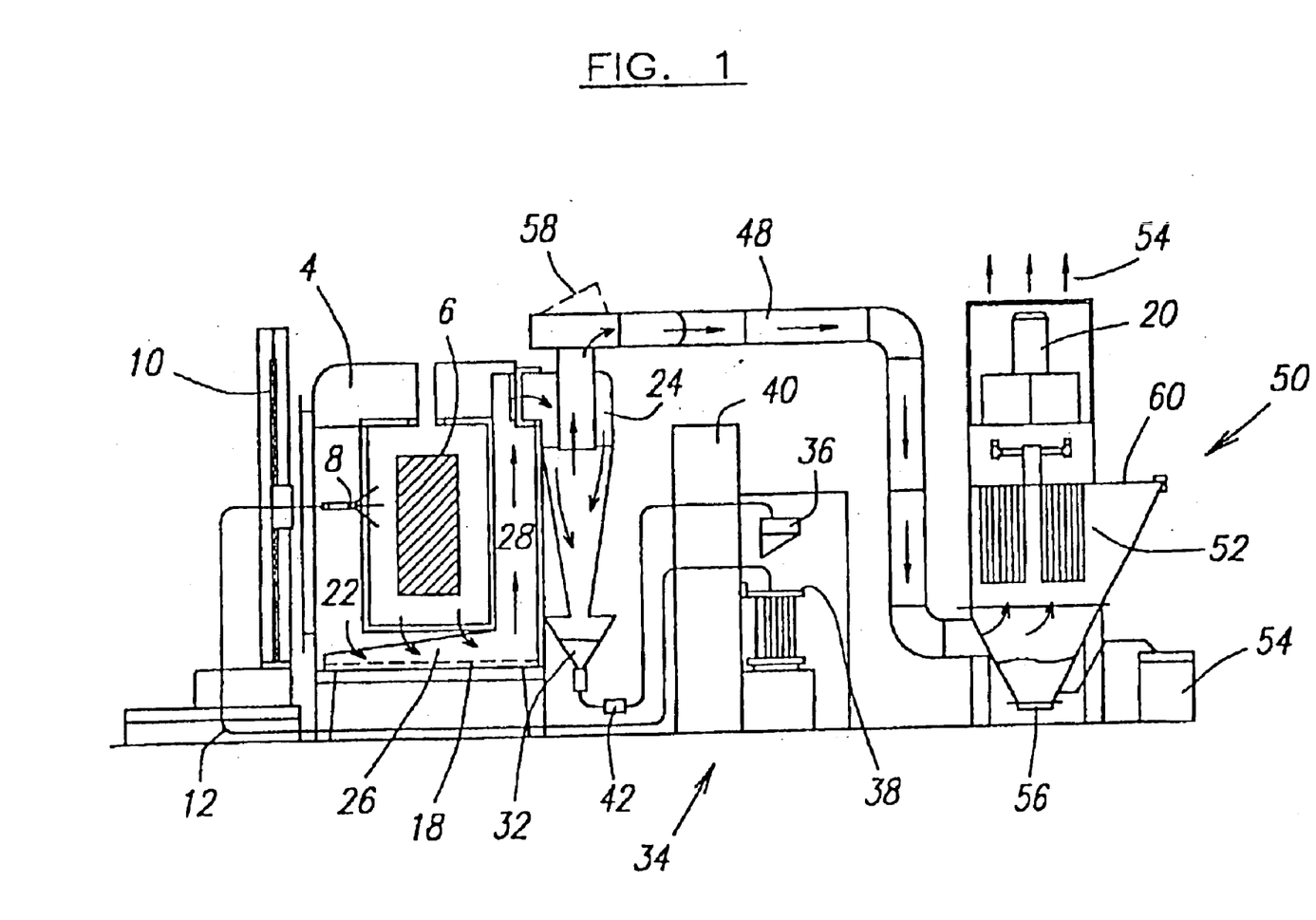
FIG. 1 is an end view of a powder spray apparatus in accordance with the invention.
Figure 2:
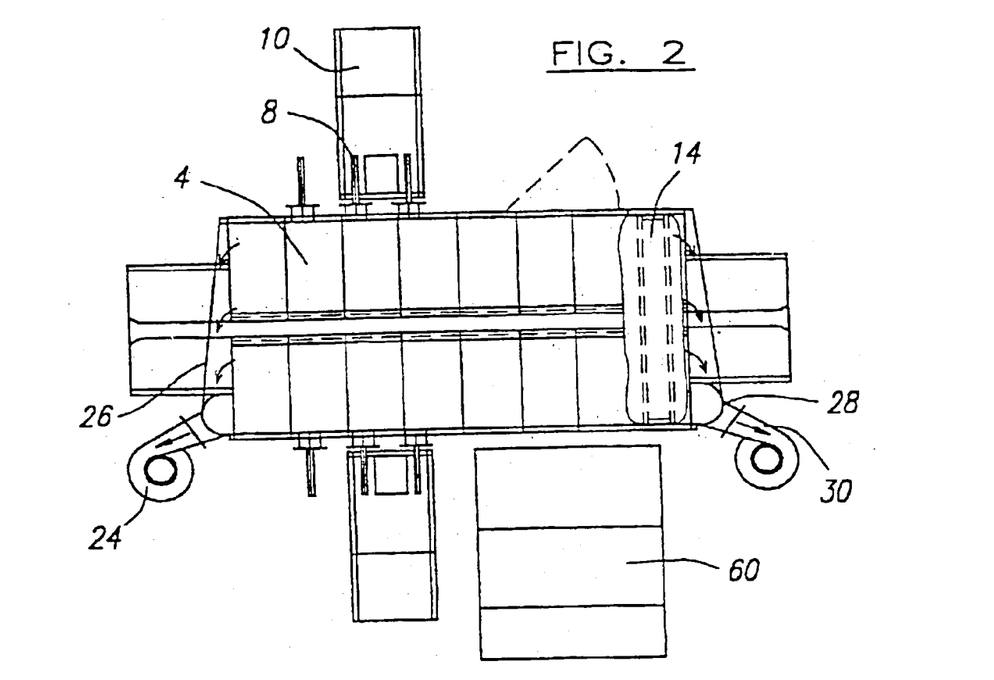
FIG. 2 is a plan view of the powder spray apparatus in FIG. 1.
Figure 3:
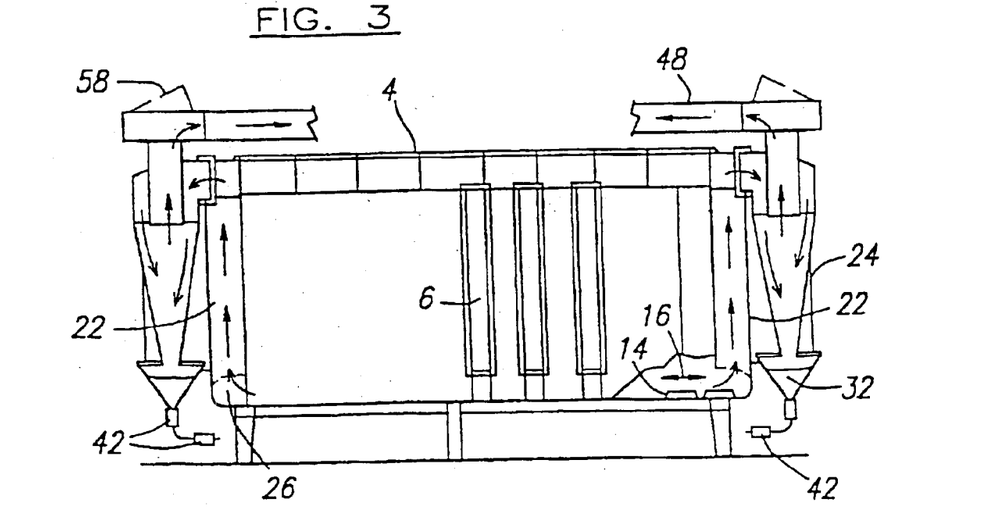
FIG. 3 is the side view of the powder spray apparatus of FIG. 1.

The powder spray apparatus generally indicated at 2 comprises a spray booth 4 having a conveyor (not shown) from which objects 6 are suspended and conveyed through the booth 4 for coating with powder by a number of spray devices 8. As illustrated in the figures, three spray devices 8 are provided on each side of the booth 4 but it will be appreciated that the number and position of spray devices 8 can be varied depending on the objects 6 to be coated. The spray devices 8 are carried on a fixed or movable support 10 and supplied with powder via a line 12.

The ceiling, walls and floor of the booth 4 are preferably made from non-conducting material and suitable materials include plastic and stainless steel. The powder sprayed by the devices 8, if electrostatically charged, will have a reduced tendency to adhere to the ceiling and walls since it will not be electrostatically attracted to the walls, ceiling and floor and instead will fall under gravity and collect on the floor of the booth 4.

The booth 4 includes a scraper system comprising a scraper bar 14 which is reciprocated back and forth, see double headed arrow 16 FIG. 3, across the floor of the booth, end wall to end wall. The scraper bar 14 is driven by an external drive mechanism (not shown) to which the scraper bar is magnetically coupled. One example of a drive mechanism is shown in U.S. Pat. No. 5,681,390 which is incorporated by reference in its entirety. The drive system may be provided in the booth 4 but the advantage of the preferred arrangement is that the drive system is protected from the powder and, on changing powder colour, only the scraper bar 14 needs to be cleaned.

The scraper bar 14 on reciprocation across the floor of the booth 4, gathers together deposited overspray powder and sweeps it towards overspray intakes 18 provided in the end walls of the booth 4 adjacent to the floor thereof. The overspray intakes 18 comprise rectangular cut-outs in the booth end walls.

Deposited overspray is drawn through the intakes 18 by the action of fan 20 and caused to flow on a current of exhaust air along and up feed channels 22 provided at each end wall of the spray booth 4 and thence to two cyclone separators 24. The feed channels 22 include a generally horizontal section 26 and a generally vertical section 28. The vertical sections 28 serve to even out the flow of air-entrained powder drawn from the booth 4 so that a substantially constant flow of air-entrained powder is delivered to each cyclone separator 24. The air-entrained powder is delivered to the cyclone separators 24 via tapered tangential feed passages 30, see FIG. 2. The taper of the feed passages 30 accelerates the overspray as it enters the cyclone separators 24 which enhances the powder separating efficiency thereof. The overspray powder, under the influence of centrifugal and gravitational forces, falls to be bottom of the cyclone separators 24 where it is collected in cone-shaped containers 32 for re-use. The collected overspray powder may be reused either through manual detachment of the cone-shaped containers 32 and transfer of the powder to a supply for the powder spray guns 8, or as shown, through an automatic system generally indicated at 34.

Figure 4:
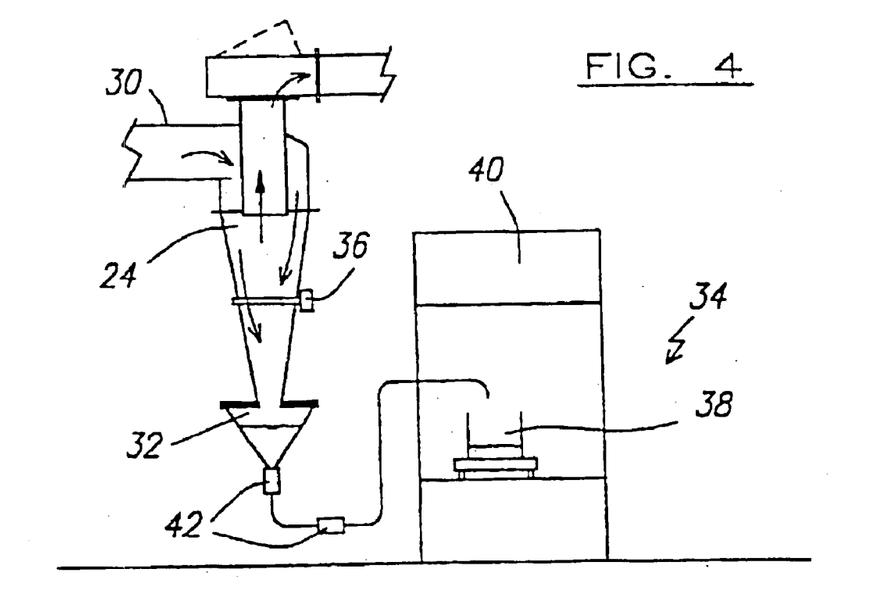
FIG. 4 is an end view of one embodiment of a cyclone separator and powder collector for use in the apparatus of FIG. 1.
Figure 5:
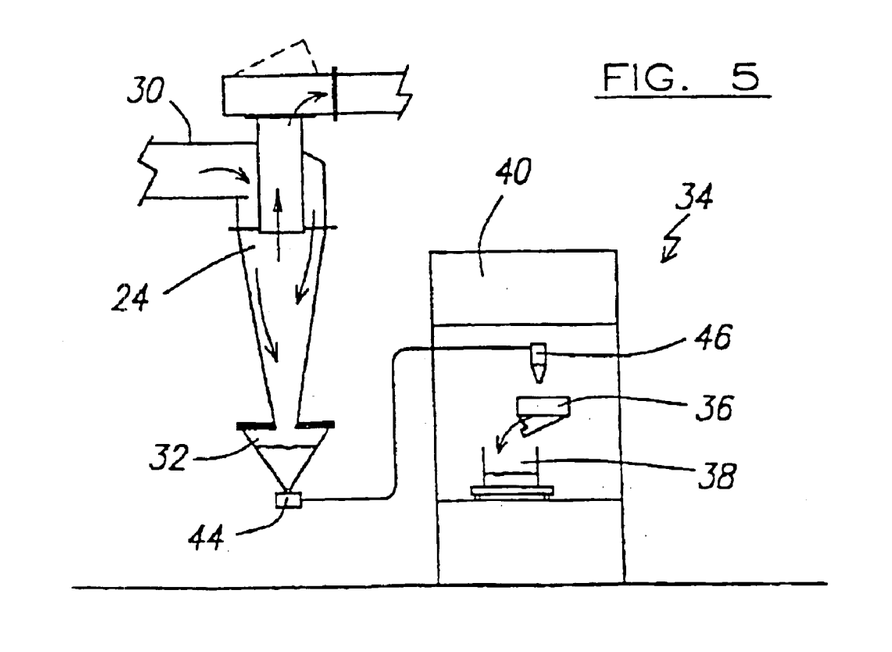
FIG. 5 is an end view of a preferred alternative to the cyclone separator and powder collector of FIG. 4.

FIGS. 4 and 5 show alternative versions of an automatic system 34 usable with the apparatus of FIGS. 1 to 3. In the system of FIG. 4, overspray powder is separated by the cyclone 24 from the air-powder mixture drawn from the powder booth 4. The powder is sieved by an integral sieve screen 36, collected in the conical collector 32 and transferred to a feed container 38 located within a ventilator enclosure 40. The transfer is accomplished using compressed air controlled by two pinch valves 42.

The system illustrated in FIG. 5 also includes a sieve 36 but instead of being located in the cyclone 24, where it can affect cyclone efficiency and is difficult to clean without contaminating the workshop, the sieve is positioned above the feed container 38 in the ventilated enclosure 40. As a result, the sieve 36 can be cleaned without contaminating the workshop and its function can be monitored at will. The pinch valves 42 which require complex controls are replaced by a venturi pump 44 which transfers the powder out of collector 32 using a compressed air input (not shown) and mini cyclone 46 which separates the powder form the transport air.

The system illustrated in FIG. 5 is most preferred. However, even with the system 34 illustrated in FIG. 1, where the sieve 36 is located in the ventilated enclosure 40, significant improvements are achieved both in terms of cyclone efficiency and control and cleaning of the sieve 36.

The exhaust air from the cyclone separators 24 which, during the normal operation of the booth contains only a small amount of overspray powder, passes through a connecting pipe 48 to a powder filter unit 50 within which the remaining powder is filtered out by filter cartridges 52. The cleaned exhaust air is then drawn out of the system by the fan 20 and exhausted to atmosphere, as shown by arrows 54. Powder separated in the unit 50 is collected in a collection hopper 54. If desired the powder can be fluidised by a fluidising plenum 56 so that it can be pumped back to sieve 36 for reuse. Alternatively it can be thrown away since it is only a relatively small amount.

The connecting pipe 48 includes an explosion relief hood 58, as does the container 60 in which the filters 52 are mounted.

The overspray powder which is collected from the booth 4 is both that which remains in the air and that which is deposited on the ceiling, walls and floor. The deposited powder is collected by the scraper bar 14 and moved to the intake openings 18. Air-borne overspray also passes through the intakes 18. However, an exhaust duct is also provided for air-borne overspray, the exhaust duct being constituted by the vertical section 28 of one or both feed channels 22, as described in detail below.

Figure 6:
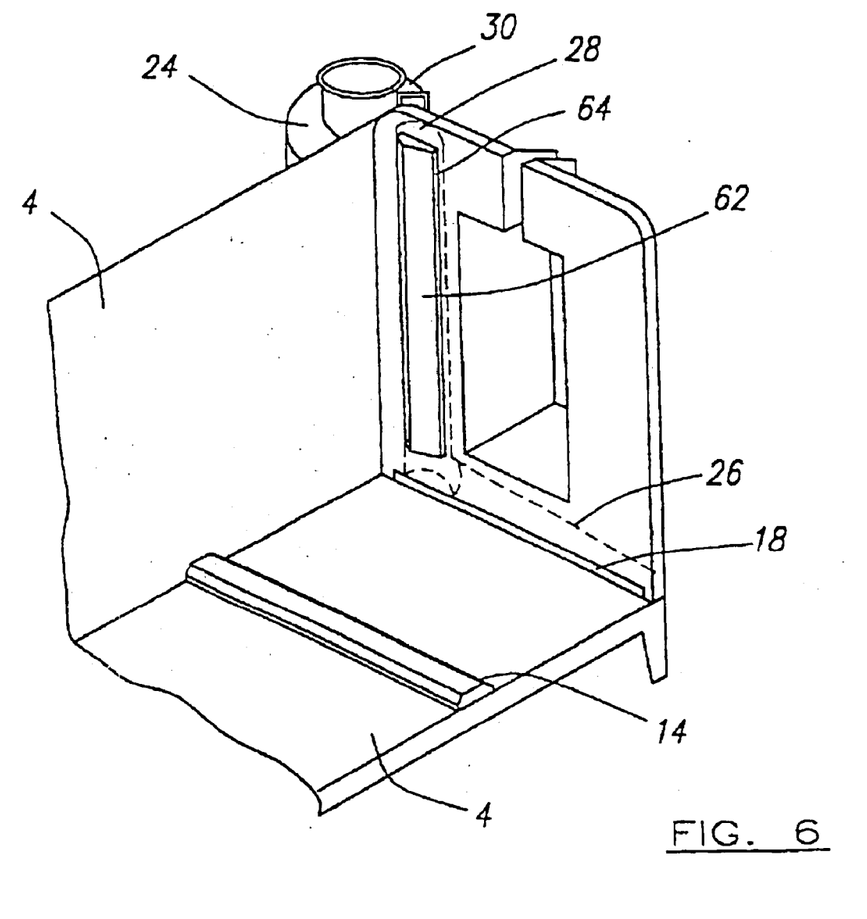
FIG. 6 is a perspective view of one end of a powder spray booth forming part of the apparatus of FIG. 1 with the side wall removed for clarity, and, FIG. 7 is a schematic view illustrating formation of an exhaust duct forming part of the apparatus of FIG. 1.

FIG. 6 illustrates the horizontal and vertical sections 26, 28 of the feed channel 22 at one end of the booth 4. Both sections 26, 28 are generally cylindrical with the horizontal section 26 tapering from one side of the booth outwardly toward the other side where it connects with the vertical section 28. The sections 26, 28 are preferably integrally formed with the booth walls, the horizontal section 26 communicating with the booth interior via the intake 18 and the vertical section 28 being located at an opening in the booth end wall. A cover 62 is positioned across the opening but spaced from the end wall to define apertures 64 either side through which exhaust air containing air-borne overspray will pass to the vertical section 28 and thence the cyclone separator 24 connected thereto. The cover 62 is preferably fully removable to provide access to the vertical section 28 from inside the booth for cleaning purposes.

Figure 7:
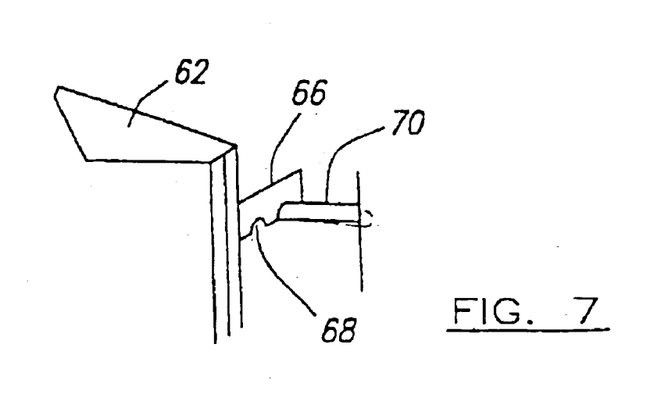

The cover 62 is preferably mounted to the end wall of the booth such that its position relative thereto can be adjusted to thereby allow for adjustment of the size of the apertures 64. One arrangement for achieving this is schematically illustrated in FIG. 7. The cover 62 carries two brackets 66 formed with cut-outs 68. The cover 62 is hung in position by locating one of the cut-outs 68 of each bracket 66 on a rod 70 provided across the opening in the end wall or on either side thereof.

During normal spraying the cover 62 is positioned to maximise the size of the apertures 64 at the upper end of the cover 62 so as in turn to maximise the withdrawal of air-borne overspray via the apertures 64. At the completion of a spraying operation, the cover 62 is moved inwards to reduce the size of the apertures so that the suction applied by the fan 20 is mainly concentrated on the intakes 18 and therefore the maximum amount of suction is available for withdrawal of the deposited powder collected by the scraper bar 14. The mounting of the cover therefore allows variation in the extract balance between the floor and ceiling of the booth 4 to give maximum efficiency during spraying and during cleaning between spraying operations.

The combination of the overspray intake location, at the end walls of the spray booth 4, and the use of the scraper bar 14 has been found to be very effective in removing overspray from the booth 4 in use, thereby reducing the amount of cleaning necessary on powder colour change. The use of non-conductive material for the walls, ceiling and floor of the booth 4 enhances the efficiency even further. The base scraper also prevents build-up of powder on the booth floor.

The illustrated arrangement, with siamese cyclone separators 24 positioned one adjacent each end wall and connected to the channels 22 at the end walls has the advantage of simplicity and reduction in channel length as well as channel bends in which powder can accumulate. The powder recycle is simplified through use of a common collection hopper 38 for the cyclone separators 24 which can alternately be positioned side by side.

The cyclone separators 24 may be removably connected with the booth 4 at the upper junction with the feed channel 22. Alternatively, the feed channels 22 and cyclone separators 24 could be formed as two units each removably connectable to the booth 4 and generally in accordance with the teachings of European Patent Application Number 94929600.8. This allows simple and quick cleaning and/or replacement of the powder recovery system on powder colour change. As noted above the feed channels 22 preferably have a removable cover 62 accessible from inside the booth for cleaning purposes.

The tangential feed to the cyclone separators 24 tends to give very efficient operation so that a high proportion of the overspray powder is separated from the spray booth exhaust air. Only a small proportion of the powder adheres to the internal surfaces of the cyclone separators 24 and this can be removed by use of a blow gun, which operation is facilitated if the bodies of the cyclone separators 24 are capable of being split in half.

What is claimed is:

1. A powder spray apparatus comprising a powder spray booth having a floor, side walls and end walls, one or more powder spray devices positioned with respect to the side walls to spray articles passed through the booth via openings in the end walls, a powder recovery module comprising at least one cyclone separator having an intake disposed close to, or towards, the ceiling of the powder spray booth, an overspray intake at each end of the booth, each overspray intake being positioned close, or adjacent, to the floor of the powder spray booth and the end wall and a feed channel connecting each intake with the cyclone separator, and a scraper bar for continuously reciprocating across the booth floor between the end walls to collect powder on the booth floor and move the collected powder towards the end walls of the spray booth adjacent to which the overspray intakes are provided; wherein the powder recovery module includes suctions means for removing overspray powder from the booth and at least one exhaust duct connected to the suction means and communicating with the booth for passage of air-borne overspray powder; wherein the pipe has an opening and a cover is positioned across the opening spaced from the pipe to define therebetween the aperture.

2. A powder spray apparatus as claimed in claim 1 wherein the position of the cover relative to the pipe opening can be varied thereby to vary the size of the aperture.

3. A powder coating material spray booth, one or more powder spray devices position to spray articles passing through the booth with powder coating material, a powder recovery module comprising a separator for separating powder coating material from air, a source of suction for drawing over sprayed powder coating material from inside the booth, art exhaust duct connected to the powder recovery module and communicating with the suction source, said suction source being operable to draw airborne over sprayed powder coating material out of the booth through the exhaust duct and into the powder recovery module, at least a portion of the exhaust duct being accessible from within the booth, said portion including a cover section which forms a part of said exhaust duct, said cover section being movable to allow over sprayed powder coating material to be removed from inside said exhaust duct during a color change operation.

4. The booth of claim 3 wherein said cover section is vertically oriented.

5. The booth of claim 4 wherein said exhaust duct has an opening at the top of the duct to connect the duct to the powder recovery module, and an opening at the bottom of the duct communicating with the interior of the spray booth.

6. The booth of claim 3 wherein said separator comprises a cyclone separator.

7. The boat of claim 5 wherein said separator comprises a cyclone separator.

8. The booth of claim 5 wherein said opening at the bottom of the duct communicates with an intake formed at one end of the spray booth.

9. The booth of claim 3 further comprising an exhaust duct positioned at each end of the spray booth, with each exhaust duct having a removable cover section.

10. The booth of claim 3 wherein said movable cover section can be moved between first and second position, wherein said first position is used for a powder coating operation and said second position is used for cleaning said exhaust duct.

11. A powder coating material spray booth, one or more powder spray devices position to spray articles passing through said booth with powder coating material, a powder recovery module, comprising a separator for separating powder coating material from air, a source of suction for drawing oversprayed powder coating material from inside said booth, an exhaust duct connected to said powder recovery module and communicating with said suction source, said suction source being operable to draw airborne oversprayed powder coating material out of said booth through said exhaust duct and into said powder recovery module, at least a portion of said exhaust duct being accessible from within said booth by a moveable cover.

12. The booth of claim 11 wherein said moveable cover can be positioned over an opening in said exhaust duct and can be moved away from said opening so that it does not cover said opening.

13. The booth of claim 12 wherein said opening into said exhaust duct is an opening in said wall of said booth.

14. The booth of claim 11 wherein said cover section is vertically oriented.

15. The booth of claim 14 wherein said exhaust duct has an opening at said top of said duct to connect said duct to said powder recovery module, and an opening at said bottom of said duct communicating with said interior of said spray booth.

16. The booth of claim 15 wherein said opening at said bottom of said duct communicates with an intake formed at one end of said spray booth.

17. The booth of claim 11 wherein said separator comprises a cyclone separator.

18. A powder booth for containing a powder coating operation, parts being coated within said booth with powder coating material by means of said powder coating operation, comprising a ceiling, two end walls, two side walls and a floor, each of said end walls having an opening to allow parts to be conveyed into said booth or out of said booth, at least one of said side walls having an opening for a powder spray gun, an overspray collector, a fan associated with said overspray collector to draw oversprayed powder from within said booth into said overspray collector, an exhaust opening in at least one of said floor, side walls, or end walls, and a duct extending from said exhaust opening to said overspray collector, further comprising an access opening into said duct through at least one of said side walls or end wall of said booth wall and a movable cover which can be placed over said access opening.

19. The booth of claim 18 wherein said moveable cover can be positioned over said access opening in said exhaust duct or moved away from said access opening so that it does not cover said opening.

20. The booth of claim 18 wherein said cover section is vertically oriented.

21. The booth of claim 20 wherein said exhaust duct has an opening at said top of said duct to connect said duct to said overspray collector, and an opening at said bottom of said duct communicating with said interior of said spray booth.

22. The booth of claim 21 wherein said opening at said bottom of said duct communicates with said exhaust opening.

23. The booth of claim 18 wherein said separator comprises a cyclone separator.

24. A powder booth for containing a powder coating operation, parts being coated within said booth with powder coating material by means of said powder coating operation, comprising a ceiling, one or more walls and a floor, an opening being provided in said one or more walls to allow parts to be conveyed into and out of said booth, at least one opening for a powder spray gun being provided in said one or more walls, an overspray collector, a fan associated with said overspray collector to draw oversprayed powder from within said booth into said overspray collector, an exhaust opening in at least one of said floor or walls, and a duct extending from said exhaust opening to said overspray collector, further comprising an access opening into said duct through said one or more wails and a movable cover which can be placed over said access opening.

25. The booth of claim 24 wherein said moveable cover can be positioned over said access opening in said exhaust duct or moved away from said access opening so that it does not cover said opening.

26. The booth of claim 25 wherein said cover section is vertically oriented.

27. The booth of claim 26 wherein said exhaust duct has an opening at said top of said duct to connect said duct to said overspray collector, and an opening at said bottom of said duct communicating with said interior of said spray booth.

28. The booth of claim 27 wherein said opening at said bottom of said duct communicates with said exhaust opening.

29. The booth of claim 24 wherein said separator comprises a cyclone separator.

* * * * *

UNITED STATES PATENT AND TRADEMARK OFFICE
CERTIFICATE OF CORRECTION

PATENT NO. : 6,852,165 B2
DATED : February 8, 2005
INVENTOR(S) : James Ainsworth et al.

It is certified that error appears in the above-identified patent and that said Letters Patent is hereby corrected as shown below:

Title page,
Item [54], Title, should read:
-- FAST COLOR CHANGE POWDER COATING BOOTH --.

Column 9,
Line 7, delete "art" and insert -- an --.
Line 30, delete "position" and insert -- positions --.

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,852,165 B2
DATED : February 8, 2005
INVENTOR(S) : James Ainsworth et al.

It is certified that error appears in the above-identified patent and that said Letters Patent is hereby corrected as shown below:

<u>Title page,</u>
Item [54], Title, should read:
-- FAST COLOR CHANGE POWDER COATING BOOTH --.

<u>Column 9,</u>
Line 7, delete "art" and insert -- an --.
Line 34, delete "position" and insert -- positions --.

This certificate supsersedes Certificate of Correction issued May 7, 2006.

Signed and Sealed this

Thirteenth Day of June, 2006

JON W. DUDAS
*Director of the United States Patent and Trademark Office*